(12) United States Patent
Oohira

(10) Patent No.: US 8,395,721 B2
(45) Date of Patent: Mar. 12, 2013

(54) LIQUID CRYSTAL DISPLAY DEVICE

(75) Inventor: Eiji Oohira, Mobara (JP)

(73) Assignees: Hitachi Displays, Ltd., Chiba (JP); Panasonic Liquid Crystal Display Co., Ltd., Hyogo-ken (JP)

( * ) Notice: Subject to any disclaimer, the term of this patent is extended or adjusted under 35 U.S.C. 154(b) by 222 days.

(21) Appl. No.: 12/957,659

(22) Filed: Dec. 1, 2010

(65) Prior Publication Data

US 2011/0128464 A1    Jun. 2, 2011

(30) Foreign Application Priority Data

Dec. 2, 2009  (JP) ................. 2009-274609

(51) Int. Cl.
*G02F 1/1333* (2006.01)
(52) U.S. Cl. ............................. 349/58; 349/56
(58) Field of Classification Search ............... 349/56, 349/58, 60
See application file for complete search history.

(56) References Cited

U.S. PATENT DOCUMENTS

| | | | |
|---|---|---|---|
| 7,705,928 B2 | 4/2010 | Tanaka | |
| 2004/0183959 A1* | 9/2004 | Ishida | 349/58 |
| 2005/0162582 A1* | 7/2005 | Kitada et al. | 349/58 |
| 2006/0125981 A1* | 6/2006 | Okuda | 349/110 |
| 2006/0133018 A1* | 6/2006 | Okuda | 361/681 |
| 2007/0242183 A1* | 10/2007 | Fukayama | 349/58 |
| 2007/0252922 A1* | 11/2007 | Oohira | 349/58 |
| 2008/0106668 A1* | 5/2008 | Sakuma | 349/58 |

FOREIGN PATENT DOCUMENTS

JP    2007-323016    12/2007

* cited by examiner

*Primary Examiner* — Brian Healy
*Assistant Examiner* — Mary El Shammaa
(74) *Attorney, Agent, or Firm* — Antonelli, Terry, Stout & Kraus, LLP.

(57) ABSTRACT

A metal frame includes a first base portion and a first wall portion rising from the first base portion at a position excluding sections of a peripheral edge portion of the first base portion. A resin frame includes a second base portion arranged so as to extend from a region on a central side of the first wall portion of the first base portion to the plurality of sections of the peripheral edge portion, and a second wall portion rising from the second base portion above the plurality of sections. A liquid crystal display panel is supported on an upper surface of the second base portion of the resin frame. A peripheral edge of the liquid crystal display panel is positioned above the first wall portion. The second wall portion of the resin frame is positioned outside the peripheral edge of the liquid crystal display panel.

10 Claims, 4 Drawing Sheets

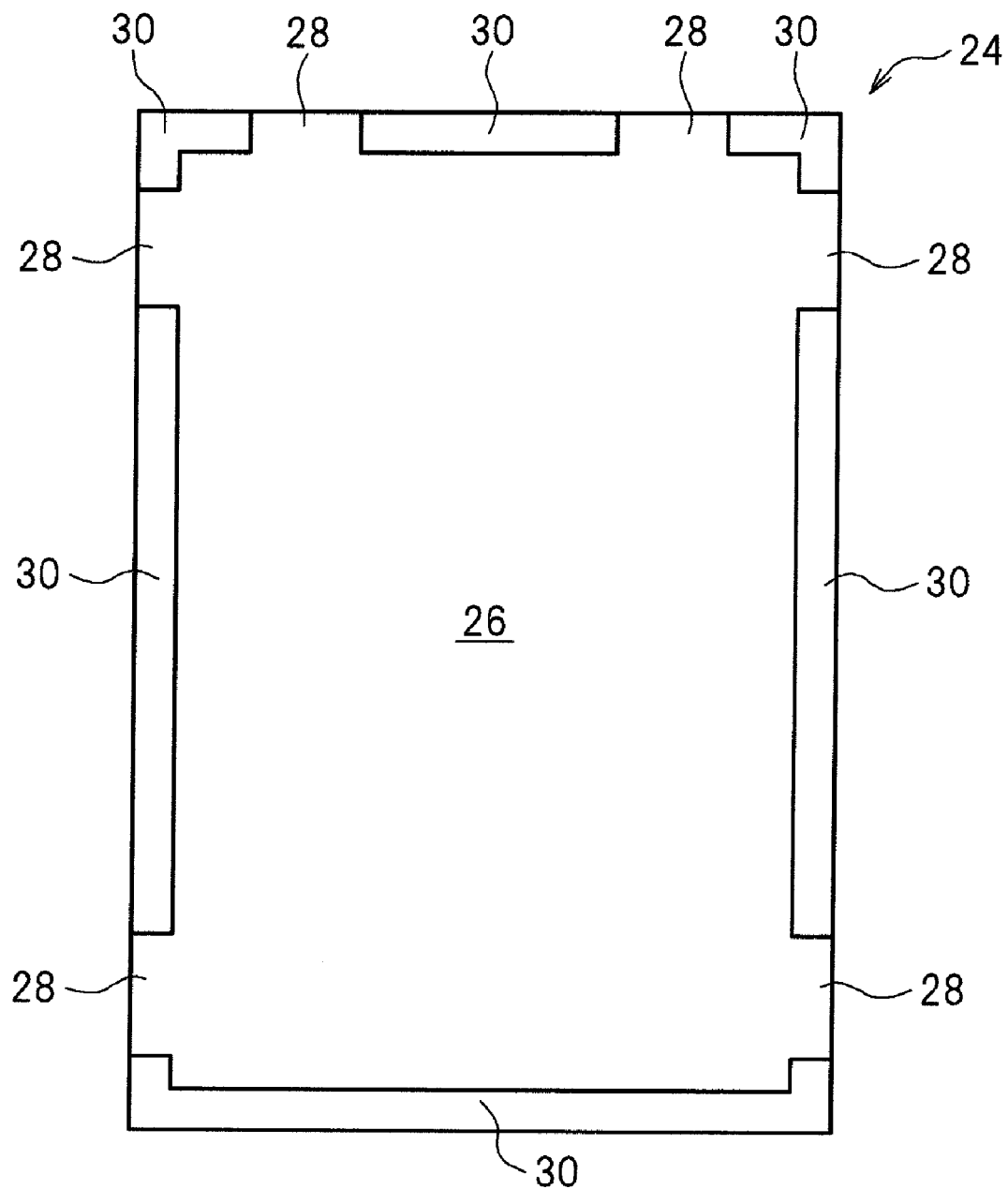

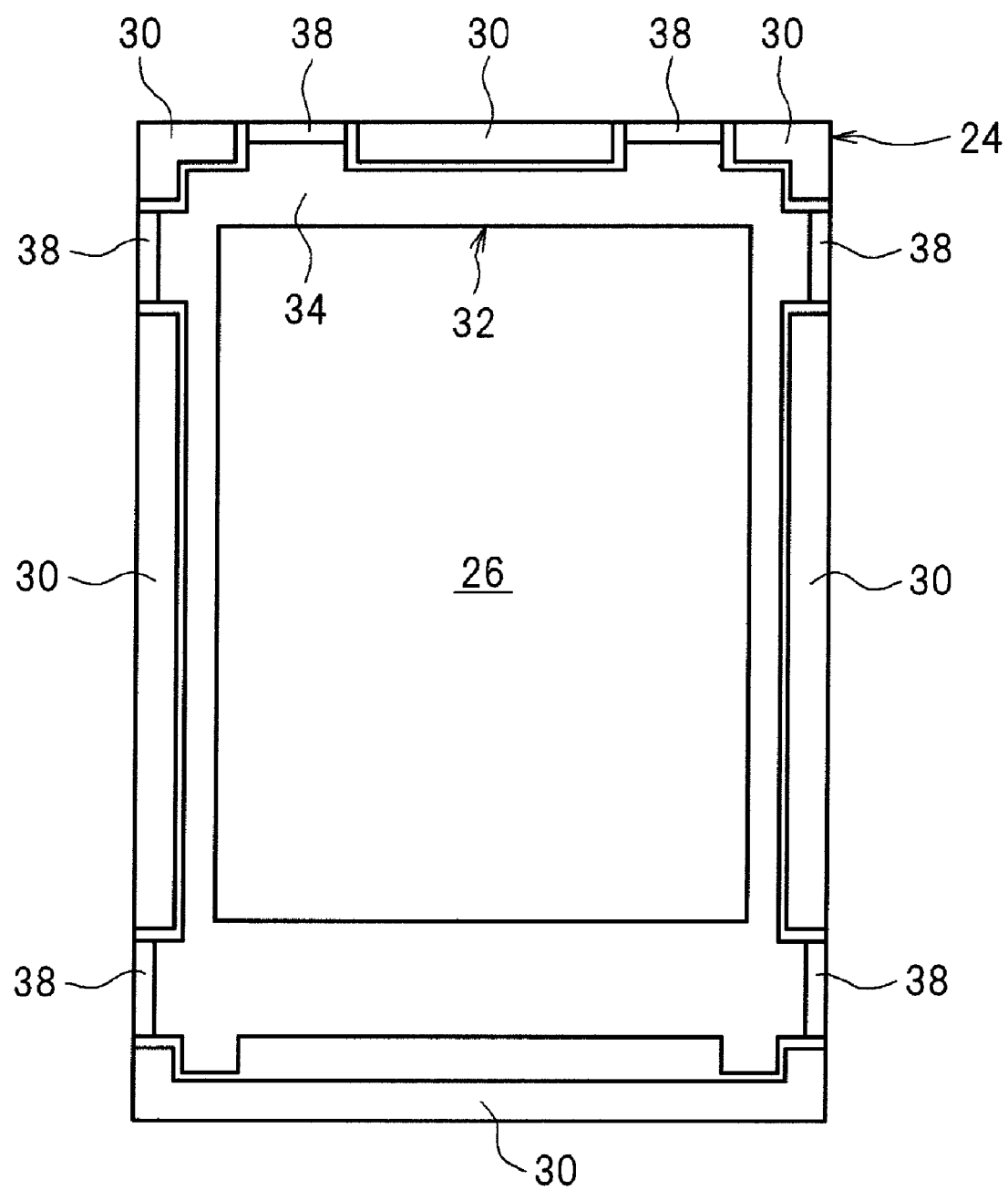

LIQUID CRYSTAL DISPLAY DEVICE

CROSS-REFERENCE TO RELATED APPLICATION

The present application claims priority from Japanese application JP2009-274609 filed on Dec. 2, 2009, the content of which is hereby incorporated by reference into this application.

BACKGROUND OF THE INVENTION

1. Field of the Invention

The present invention relates to a liquid crystal display device.

2. Description of the Related Art

A liquid crystal display device having a structure with a resin frame arranged between a liquid crystal display panel and a metal frame has been known (JP 2007-323016 A). The metal frame protects the liquid crystal display panel, while the resin frame functions as a cushioning member preventing a direct contact between the liquid crystal display panel and the metal frame.

In the structure disclosed in JP 2007-323016 A, the metal frame has a first base portion facing the liquid crystal display panel and a wall portion rising from a peripheral edge of the first base portion. The liquid crystal display panel is arranged in a region surrounded by the wall portion. A cutout is formed in the wall portion of the metal frame. The resin frame integrally has a portion arranged above the first base portion and a portion arranged above the cutout of the wall portion of the metal frame. The resin frame has a size not exceeding the outline of the metal frame. That is, the outline of the liquid crystal display device is determined by the size of the metal frame.

According to the structure, since the portion of the resin frame, alongside the liquid crystal display panel, is situated above the cutout of the wall portion of the metal frame, the resin frame does not lie between the wall portion and the liquid crystal display panel. Accordingly, since the metal frame and the resin frame do not overlap each other alongside the liquid crystal display panel, the size of the liquid crystal display device can be reduced. Recently, however, a reduction in size of liquid crystal display devices has progressed, which requires further improvement.

SUMMARY OF THE INVENTION

It is an object of the invention to reduce the size of a liquid crystal display device.

(1) A liquid crystal display device according to an aspect of the invention includes: a metal frame including a first base portion and a first wall portion rising from the first base portion at a position excluding a plurality of sections of a peripheral edge portion of the first base portion; a resin frame including a second base portion arranged so as to extend from a region on a central side of the first wall portion of the first base portion to the plurality of sections of the peripheral edge portion, and a second wall portion rising from the second base portion above the plurality of sections; and a liquid crystal display panel supported on an upper surface of the second base portion of the resin frame, wherein a peripheral edge of the liquid crystal display panel is positioned above the first wall portion, and the second wall portion of the resin frame is positioned outside the peripheral edge of the liquid crystal display panel. According to the aspect of the invention, since the peripheral edge of the liquid crystal display panel is positioned above the first wall portion of the metal frame, the metal frame can be reduced in size by the amount of an overlap length of the liquid crystal display panel and the metal frame. This makes it possible to reduce the size of the liquid crystal display device.

(2) In the liquid crystal display device according to (1), the resin frame may be formed such that below the second wall portion, the second base portion is constricted from the second wall portion, and the first base portion of the metal frame may be formed so as to protrude beyond the second base portion at the plurality of sections.

(3) In the liquid crystal display device according to (1) or (2), the first base portion may have a rectangular planar shape, and at least one of the plurality of sections where the first wall portion does not exist may be present at a side edge portion along a side of the rectangle.

(4) In the liquid crystal display device according to any one of (1) to (3), a thickness of the second wall portion may be smaller than that of the first wall portion.

BRIEF DESCRIPTION OF THE DRAWINGS

FIG. 4 is a plan view showing only a metal frame of FIG. 1.

FIG. 5 is a plan view showing only the metal frame and a resin frame of FIG. 1.

DETAILED DESCRIPTION OF THE INVENTION

Hereinafter, an embodiment of the invention will be described with reference to the drawings.

Figure 1:
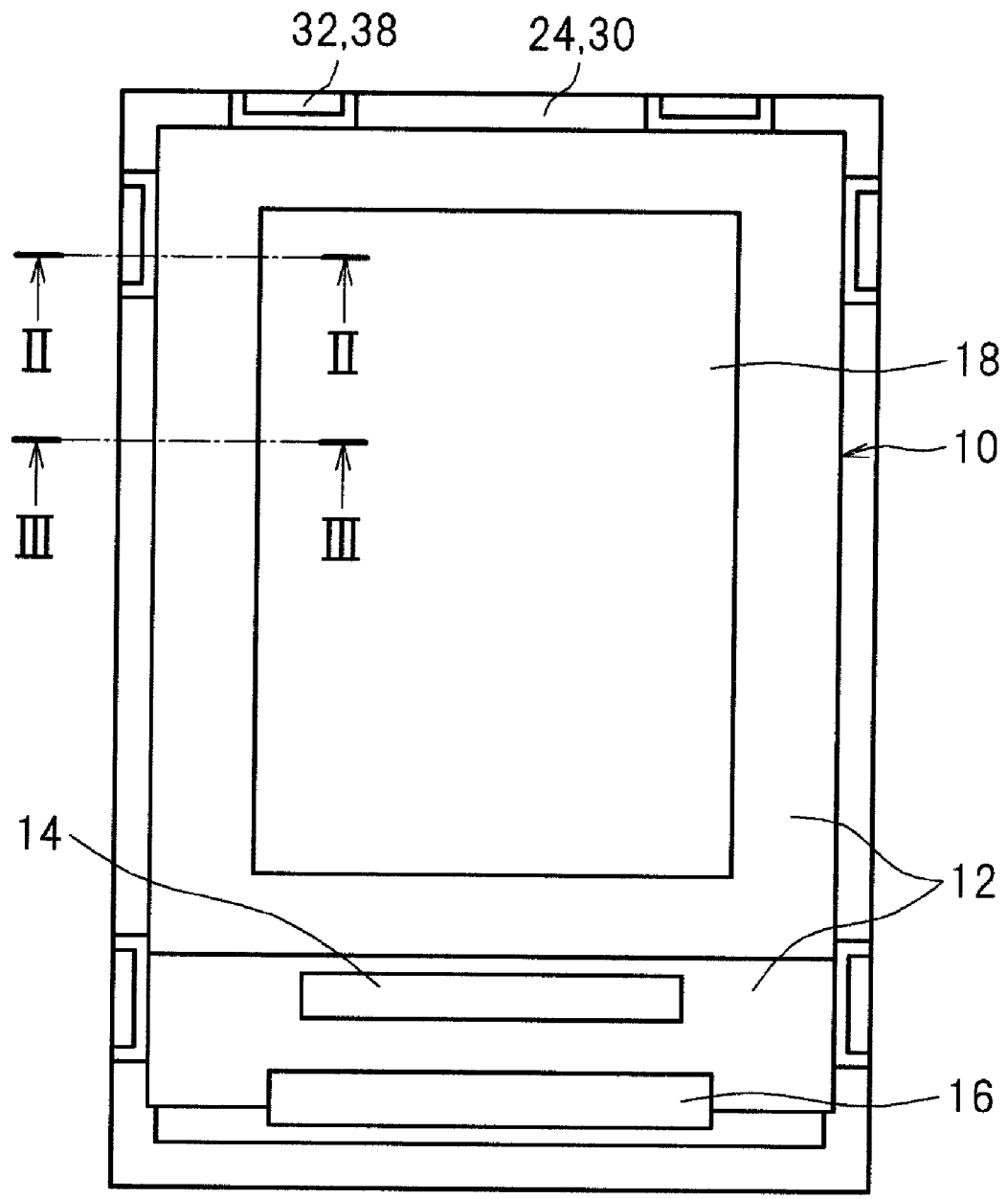
FIG. 1 is a plan view showing a liquid crystal display device according to an embodiment of the invention.
Figure 2:
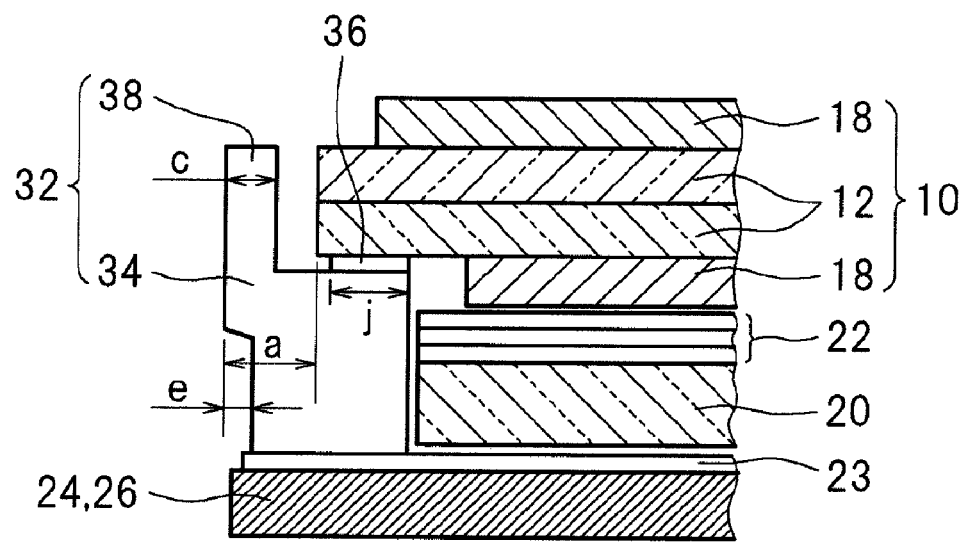
FIG. 2 is a cross-sectional view of the liquid crystal display device taken along line II-II of FIG. 1.
Figure 3:
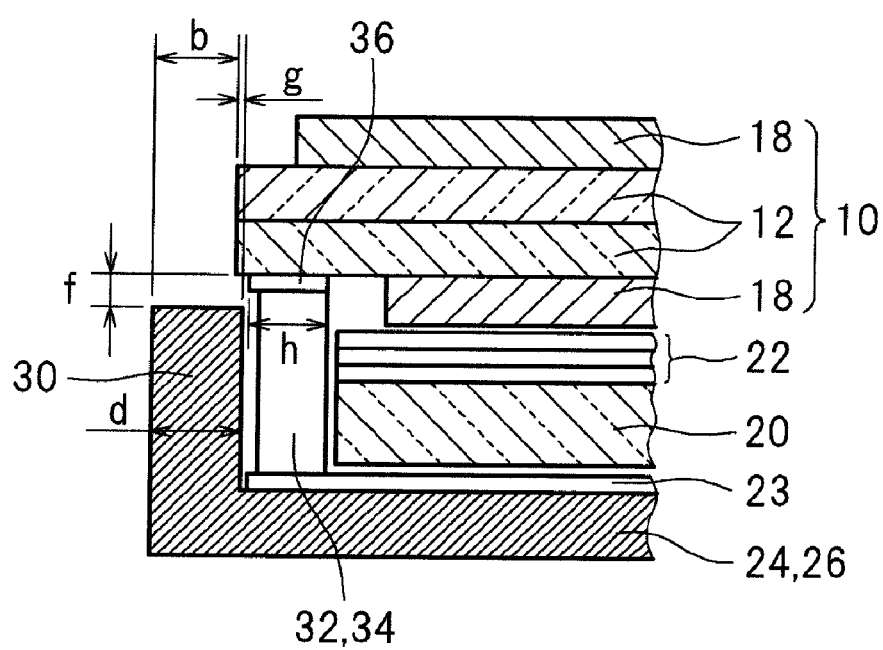
FIG. 3 is a cross-sectional view of the liquid crystal display device taken along line of FIG. 1.

FIG. 1 is a plan view showing a liquid crystal display device according to the embodiment of the invention. FIG. 2 is a cross-sectional view of the liquid crystal display device taken along ling II-II of FIG. 1. FIG. 3 is a cross-sectional view of the liquid crystal display device taken along line of FIG. 1.

The liquid crystal display device has a liquid crystal display panel 10. The liquid crystal display panel 10 has a pair of substrates 12 (glass substrates) between which not-shown liquid crystal lies. One of the substrates 12 is a TFT (Thin Film Transistor) substrate (or an array substrate) including thin film transistors, pixel electrodes, and wires, while the other substrate 12 is a color filter substrate. For driving the liquid crystal display panel 10, any mode such as IPS (In-Plane Switching) mode, TN (Twisted Nematic) mode, or VA (Vertical Alignment) mode may be employed. Electrodes and wires according to the mode are formed.

An integrated circuit chip 14 incorporating a driver circuit for driving the liquid crystal is mounted at an edge portion of the one of the substrates 12, and a flexible wiring board 16 is attached to the edge portion.

The liquid crystal display panel 10 includes polarizers 18. Each of the polarizers 18 is bonded to a region (region surrounded by a peripheral edge portion of the substrate 12) avoiding edge portions (the peripheral edge portion) of the substrate 12.

The liquid crystal display device has a light guide plate 20 as one part of a backlight. The light guide plate 20 is used for converting light of a light-emitting diode (not shown) as a point light source into a surface light source to irradiate the liquid crystal display panel 10 with the light.

An optical sheet group 22 is arranged between the liquid crystal display panel 10 and the light guide plate 20. The optical sheet group 22 includes a diffusive sheet and a prism sheet. A reflective sheet 23 is arranged below the light guide plate 20 (on the opposite side from the optical sheet group 22).

FIG. 4 is a plan view showing only a metal frame of FIG. 1. The liquid crystal display device has a metal frame 24. The metal frame 24 includes a first base portion 26. The first base portion 26 has a rectangular planar shape. The metal frame 24 includes first wall portions 30 rising from the first base portion 26 at positions excluding a plurality of sections 28 of a peripheral edge portion of the first base portion 26. In other words, the peripheral edge portion surrounding the central portion of the first base portion 26 in a seamless manner includes sections at which the first wall portion 30 is formed and the plurality of sections 28 at which the first wall portion 30 is not formed. At least one of the plurality of sections 28 at which the first wall portion 30 does not exist is present at a side edge portion along a side of the rectangular first base portion 26.

FIG. 5 is a plan view showing only the metal frame and a resin frame of FIG. 1. The liquid crystal display device has a resin frame 32. The resin frame 32 includes a second base portion 34 arranged so as to extend from a region on a central side of the first wall portion 30 of the first base portion 26 of the metal frame 24 to the plurality of sections 28 (the regions where the first wall portion 30 does not exist) of the peripheral edge portion. In short, the second base portion 34 is a portion mounted on the first base portion 26. As shown in FIGS. 2 and 3, the reflective sheet 23 may lie between the first base portion 26 and the second base portion 34.

The liquid crystal display panel 10 is supported on an upper surface of the second base portion 34. Specifically, the liquid crystal display panel 10 and the upper surface of the second base portion 34 are bonded together via an adhesive member 36 (for example, a double-sided adhesive tape).

The resin frame 32 includes second wall portions 38 rising from the second base portion 34 above the plurality of sections 28 (the regions where the first wall portion 30 does not exist) of the peripheral edge portion of the first base portion 26 (refer to FIG. 2). The second wall portions 38 are situated alongside (outside the peripheral edge of) the liquid crystal display panel 10 and serve as stoppers or cushioning members for restricting lateral movement of the liquid crystal display panel 10. A distance a (FIG. 2) from an edge of the liquid crystal display panel 10 to an outer edge of the second wall portion 38 is equal to a distance b (FIG. 3) from the edge of the liquid crystal display panel 10 to an outer edge of the first wall portion 30 of the metal frame 24. That is, an outer surface of the resin frame 32 is flush with an outer surface of the metal frame 24.

As shown in FIG. 5, in the upper surface of the second base portion 34 (the region where the second wall portions 38 are not formed), a region adjacent to the second wall portion 38 is wider than a region next to the first wall portion 30 of the metal frame 24. Here, the region adjacent to the second wall portion 38 means the region of the upper surface of the second base portion 34 inside the second wall portion 38. The region next to the first wall portion 30 means the region of the upper surface of the second base portion 34 inside the first wall portion 30 and facing the first wall portion 30. Therefore, a width j (FIG. 2) of the adhesive member 36 disposed in the region adjacent to the second wall portion 38 is larger than a width h (FIG. 3) of the adhesive member 36 disposed in the region next to the first wall portion 30 of the metal frame 24. However, the width h of the adhesive member 36 is preferably 0.6 mm or more.

A thickness c (FIG. 2) of the second wall portion 38 is smaller than a thickness d (FIG. 3) of the first wall portion 30. The resin frame 32 is formed such that below the second wall portion 38, the second base portion 34 is constricted from the second wall portion 38. For example, a dimension e (FIG. 2) of the constriction is preferably 0.05 mm or more. Since the resin frame 32 has the constriction, the peripheral edge portion of the first base portion 26 of the metal frame 24 protrudes beyond the second base portion 34 at the plurality of sections 28 (the regions where the first wall portion 30 does not exist).

As shown in FIG. 3, the peripheral edge of the liquid crystal display panel 10 is positioned above the first wall portion 30. That is, the peripheral edge of the liquid crystal display panel 10 and the first wall portion 30 overlap each other in a project plane. A gap f (FIG. 3) between a lower surface of the liquid crystal display panel 10 and an upper surface of the first wall portion 30 (the surfaces facing each other) is preferably 0.1 mm or more. The thickness d of the first wall portion 30 and the distance b (FIG. 3) from the edge of the liquid crystal display panel 10 to the outer edge of the first wall portion 30 of the metal frame 24 have the relationship of d>b.

According to the embodiment, since the peripheral edge of the liquid crystal display panel 10 is positioned above the first wall portion 30 of the metal frame 24, the metal frame 24 can be reduced in size by the amount of an overlap length g (FIG. 3) of the liquid crystal display panel 10 and the metal frame 24. This makes it possible to reduce the size of the liquid crystal display device.

The invention is not limited to the embodiment but can be modified in various ways. For example, the configurations described in the embodiment can be replaced with substantially the same configurations as those of the embodiment, a configuration providing the same functions and advantages as those of the embodiment, or a configuration capable of achieving the same objects as those of the embodiment.

What is claimed is:

1. A liquid crystal display device comprising:
   a metal frame including a first base portion and a first wall portion rising from the first base portion at a position excluding a plurality of sections of a peripheral edge portion of the first base portion;
   a resin frame including a second base portion arranged so as to extend from a region on a central side of the first wall portion of the first base portion to the plurality of sections of the peripheral edge portion, and a second wall portion rising from the second base portion above the plurality of sections; and
   a liquid crystal display panel supported on an upper surface of the second base portion of the resin frame, wherein
   a peripheral edge of the liquid crystal display panel is positioned above the first wall portion, and
   the second wall portion of the resin frame is positioned outside the peripheral edge of the liquid crystal display panel.

2. The liquid crystal display device according to claim 1, wherein
   the resin frame is formed such that below the second wall portion, the second base portion is constricted from the second wall portion, and
   the first base portion of the metal frame is formed so as to protrude beyond the second base portion at the plurality of sections.

3. The liquid crystal display device according to claim 1, wherein
the first base portion has a rectangular planar shape, and
at least one of the plurality of sections where the first wall portion does not exist is present at a side edge portion along a side of the rectangle.

4. The liquid crystal display device according to claim 1, wherein
a thickness of the second wall portion is smaller than that of the first wall portion.

5. The liquid crystal display device according to claim 1, further comprising an adhesive member bonding the liquid crystal display panel and the second base portion together, wherein
a width of the adhesive member is greater at a portion disposed in a region adjacent to the second wall portion than at a portion disposed in a region next to the first wall portion.

6. The liquid crystal display device according to claim 1, wherein
a distance from an edge of the liquid crystal display panel to an outer edge of the second wall portion is equal to a distance from the edge of the liquid crystal display panel to an outer edge of the first wall portion.

7. The liquid crystal display device according to claim 2, wherein
a dimension of the constriction is 0.05 mm or more.

8. The liquid crystal display device according to claim 1, wherein
the peripheral edge of the liquid crystal display panel and the first wall portion face each other with a gap of 0.1 mm or more.

9. The liquid crystal display device according to claim 1, wherein
a thickness of the first wall portion is greater than a distance from an edge of the liquid crystal display panel to an outer edge of the first wall portion.

10. The liquid crystal display device according to claim 1, wherein
a thickness of the second wall portion is smaller than that of the first wall portion.

* * * * *